United States Patent [19]

Howard, Jr.

[11] Patent Number: 6,080,820
[45] Date of Patent: Jun. 27, 2000

[54] (FLUOROVINYL ETHER)-GRAFTED HIGH-SURFACE-AREA POLYOLEFINS AND PREPARATION THEREOF

[75] Inventor: Edward G. Howard, Jr., Hockessin, Del.

[73] Assignee: E. I. du Pont de Nemours and Company, Wilmington, Del.

[21] Appl. No.: 09/089,324

[22] Filed: Jun. 2, 1998

Related U.S. Application Data

[62] Division of application No. 08/732,540, Oct. 15, 1996, Pat. No. 5,798,417.

[51] Int. Cl.[7] .............................. C08F 255/02; C08F 8/20
[52] U.S. Cl. ........................ 525/244; 525/263; 525/276; 525/291; 525/293; 525/301; 525/302; 502/159
[58] Field of Search ...................... 525/244, 263, 525/276, 291, 293, 301, 302; 502/159

[56] References Cited

U.S. PATENT DOCUMENTS

| | | | |
|---|---|---|---|
| 4,012,303 | 3/1977 | D'Agostino et al. | 204/159.17 |
| 4,187,210 | 2/1980 | Howard, Jr. | |
| 4,384,941 | 5/1983 | Okamoto et al. | 204/129 |
| 4,396,727 | 8/1983 | Ishigaki et al. | 521/27 |
| 4,547,474 | 10/1985 | Olah | 502/168 |
| 4,548,993 | 10/1985 | Garagnani et al. | 525/195 |
| 4,605,685 | 8/1986 | Momose et al. | 522/124 |
| 4,774,132 | 9/1988 | Joffee et al. | 428/304.4 |
| 4,806,581 | 2/1989 | Walker | 524/178 |
| 4,901,389 | 2/1990 | Poulenard et al. | 8/115.63 |
| 5,292,584 | 3/1994 | Howard et al. | 428/327 |
| 5,656,386 | 8/1997 | Scherer et al. | 429/23 |
| 5,743,940 | 4/1998 | Sugo et al. | |

FOREIGN PATENT DOCUMENTS

| | | |
|---|---|---|
| 58-198535 | 11/1983 | Japan. |
| 1-289817 | 11/1989 | Japan. |
| 2-60911 | 3/1990 | Japan. |

*Primary Examiner*—Jeffrey C. Mullis

[57] ABSTRACT

High-surface-area polyolefins grafted with certain fluoroalkylvinylether sulfonate or carboxylate monomers, and their method of preparation, are disclosed. Such materials are useful as catalysts and as membranes in electrochemical cells.

18 Claims, No Drawings

(FLUOROVINYL ETHER)-GRAFTED HIGH-SURFACE-AREA POLYOLEFINS AND PREPARATION THEREOF

This application is a divisional application of Ser. No. 08/732,540, filed on Oct. 15, 1996 now U.S. Pat. No. 5,798,417.

FIELD OF THE INVENTION

This invention relates to polyolefins grafted with certain fluoroallylvinylether sulfonate or carboxylate monomers, their preparation, and catalysts or membranes made therefrom.

TECHNICAL BACKGROUND

Grafing, or graft-copolymerization, of various fluorinated monomers to olefinic polymers, including polyethylene and ethylene copolymers, is known. Monomers disclosed in the prior art for grafting to polyolefins include certain fluorinated olefins such as perfluoroalkyl (meth)acrylates and perfluoroalkyl vinylether sulfonates and carboxylates. The catalysts used for preparing grafted polyolefins have included free-radical sources such as peroxides and ionizing radiation.

Japanese Patent Kokai No. 2 60911 A discloses the grafting of fluoroalkyl (meth)acrylates to olefinic polymers, including polyethylene and ethylene copolymers, by heating monomer and polymer in the presence of catalysts, such as benzoyl peroxide, in nonaqueous solvents. The weight ratio of olefn polymer to grafted fluoroalkyl monomer is in the range of 50 to 99/1 to 50. The raft copolymers are useful as water and oil repellents.

Japanese Patent Kokai No. 1 289817 A discloses the grafting to polyolefins of fluorine-containing monomers which do not contain an ester group. These polyolefins include polyethylene and poly-1-butene. These fluorinated monomers include te raf iuoroethylene, fuoroethylene, vinyl fluoride and vinylidene fluoride. The grafting is initiated by free-radical initiators such as peroxides, including benzoyl peroxide, or ionizing radiation, optionally in the presence of a solvent. The grafted products contain 1–1000 weight % of fluorinated monomer, based on the amount of polyolefin. The products are oil and water repellent and resistant to hydrolysis.

Japanese Patent Application 58 198535 A discloses cation exchange membranes prepared by electron-radiation grafting of perfluorovinyl ether carboxylic acid monomers, optionally using a monomer-compatible solvent, onto base polymer films, preferably polyethylene film. Disclosed monomers include those of the formula (a) $CF_2=CX$ $(OCF_2CFY)_1(O)_m(CFY')_n A$ wherein 1 is 0 or 1–3, m is 0 or 1; n is 0 or 1–12; X is F or CF3; Y and Y' are F or perfluoroalkyl having 1–10 carbon atoms; and A includes COF, $CO_2H$, $CO_2R^1$, $CO_2M$ and CN; or (b) $CF_2=CFO$ $(CF_2)_nX$ wherein n is 0–12 and X is CN, COF, $CO_2H$, $CO_2R^1$ and $CO_2M$; $R^1$ is alkyl having 1–10 carbon atoms, and M is alkali metal or ammonium.

U.S. Pat. No. 4,384,941 discloses an electrolytic cell comprising a cation exchange membrane consisting of polyethylene grafted with a perfluorovinyl ether sulfonate or sulfonic acid monomer. The latter include monomers of the formula $CF_2=CF[OCF_2CF(CF3)]_1OCF_2CF_2SO_2Z$ wherein 1 is 1–3 and Z is OH, F, $NH_2$, $ONH_4$ or OM where M is alkali metal. Grafting is induced by ionizing radiation.

U.S. Pat. No. 4,396,727 discloses a cation-exchange membrane comprising a fluorovinyl sulfonic acid monomer which is radiation grafted to polyethylene. Disclosed monomers include those disclosed in the aforementioned U.S. Pat. No. 4,384,941.

U.S. Pat. No. 4,012,303 discloses polymeric membranes useful in electrochemical cells prepared by radiato n grafting of perf luoralkene sulfonyl fluoride monomers such as

where x is 0 or 1–8, onto various polymeric films, including polyethylene.

U.S. Pat. No. 4,548,993 discloses crosslinking of polymers such as polyethylene, ethylene/vinyl acetate copolymers, and ethylene/propylene copolymers for improved rigidity and creep resistance by grafting said polymers with a carboxylic acid at a temperature of at least 170° C., optionally in the presence of a free radical generator such as an organic peroxide, and optionally followed by the addition of a salt-forming base.

U.S. Pat. No. 4,547,474 discloses Friedel-Crafts catalysts comprising $C_4$–$C_{18}$ fluorinated sulfonic acids and selected higher valency fluorinated Lewis acids such as $SbF_5$, $NbF_5$, $TaF_5$ and $AsF_5$, supported on chalcidic solids such as fluorinated alumina or alumina-silica. Nafion® perfluorovinylether sulfonic acid resins are known to be effective acidic catalysts for Friedel-Crafts alkylation reactions, isomerization reactions, and various polymerization reactions. Nafion® resins are also used commercially as ion-exchange membranes in electrolytic cells.

SUMMARY OF THE INVENTION

This invention provides a process for preparing a crosslinked graft copolymer comprising coating an olefinic polymer with a catalytically effective amount of a free-radical catalyst, and contacting and reacting the catalyst-coated olefinic polymer with at least one fluorinated monomer, said olefinic polymer comprising repeat units of ethylene and, optionally, one or more comonomers selected from the group consisting of $CH_2=CHR$, with R as defined below, carbon monoxide, vinyl acetate, alkyl (meth) acrylates and alkylvinyl ethers, wherein said R and each of said alkyl groups may contain 1–8 carbon atoms; and said fluorinated monomer having the following formula (1):

wherein:

X is $-SO_2Y$, $-CN$, $-COF$ or $-CO_2Y'$, n is 0 or 1–6, m is 1–3;

Y is F, OM or OH and Y' is H, R' or M;

R' is $C_{1-8}$ alkyl; and

M is alkali metal, ammonium or quaternary ammonium; said graft copolymer containing about 0.1 to about 17 mol % of grafted pendant groups of fluorinated monomer. The olefinic polymer is optionally supported on an inorganic oxide prior to coating with it with a catalytic effective amount of a free-radical catalyst.

Also included in this invention are: crosslinked graft copolymers prepared by the above process; m i x ues consisting essentially of about 25 to 90 weight % of ungrafted olefinic polymer and about 10 to about 75 weight % of a graft copolymer of the invention; and powders, shaped articles, catalysts and membranes comprising the graft copolymer products.

DETAILS OF THE INVENTION

Olefinic polymers suitable for use in the present process include polyethylene and ethylene copolymers wherein the comonomer is selected from linear 1-olefins (containing 3 to 10 carbon atoms), carbon monoxide, vinyl acetate, alkyl (meth)acrylate, and alkylvinyl ether, wherein the aforesaid alkyl groups contain 1–8 carbon atoms. Preferably, any comonomers are present in an amount of up to about 10 mol percent. The olefinic polymers preferably have a melt index ranging from less than 0.01 (as for ultr hhigh molecular weight linear polyethylene) to at least about 200. A more preferred range is from less than about 0.01 to about 20. Both high and low density polyethylene are suitable.

Such olefinic polymers may be supported on a solid inorganic oxide, preferably a magnetic metal oxide. A process for preparing suitable oxide-supported olefinic polymers is described by Howard in U.S. Pat. No. 4,187,210 and Howard et al. in U.S. Pat. No. 5,292,584, which are herein incorporated by reference in their entirety. In the practice of the present invention, the free-radical catalyst is preferably coated onto the base olefinic polymer, which may be in any desired physical form such as powder, film, fiber, fibrous sheet, or molded object, prior to contacting and reacting with the fluorinated monomer. The catalyst may be conveniently coated onto the polymer from a solution or dispersion in a suitable organic liquid which is inert towards the grafting reaction conditions.

Suitable free-radical catalysts inlcude, but are not limited to, inorganic and organic peroxides and azo compounds such as $\alpha,\alpha'$-azobis(isobutyronitrile) or $\alpha,\alpha'$-azobis (dimethylvaleronitrile). Organic peroxides are preferred free-radical catalysts; benzoyl peroxide is most preferred. Suitable solvents for the peroxidic catalysts are halogenated hydrocarbons such as methylene chloride.

A catalytically effective amount of free-radical catalyst is usually in the range of about 1 weight % to about 30 weight % of the olefinic polymer present, preferably about 3 weight % to about 25 weight %.

The fluorinated monomers (fluoromonomers) employed in the present invention are usually liquid at room temperature and may be employed without solvent or dispersant. Fluoromonomers that are viscous liquids or solids at room temperature may be dissolved or dispersed in a suitable inert solvent or dispersant before contacting the olefinic polymer. Suitable solvents for fluoromonomers include perfluoroalkylene ethers and fluorinated haloalkanes such as trichlorotrifluoroethane. If solvents or dispersants are employed for either catalyst or fluoromonomer, they should be removed before the grafting reaction is initiated by heating.

In the preferred invention process, a fluoromonomer of formula (1) above wherein X is $SO_2F$, COF, $CO_2R'$ or CN is grafted to an olefnic polymer by heating the catalyst-coated olefinic polymer, optionally supported on an inorganic oxide, in an excess of said fluoromonomer under an inert atmosphere at a temperature at which the catalyst is activated, typically in the range of about 25° to about 140° C., more preferably about 80° to about 125° C., most preferably about 90° to 120° C. Pressure is not critical, but atmospheric pressure is preferred. The catalyst-coated olefrnic polymer is normally immersed in the fluoromonomer, which is employed "neat" or as a solution or dispersion, any solvents or dispersants preferably being removed prior to heating. By "inert atmosphere" is meant a gaseous or vaporous environment that is stable and inert under process conditions. Suitable gases include nitrogen and the noble gases. Vacuum may also be employed but is not preferred.

In the present grafting process, about 0.1 to about 17 mol %, preferably about 0.5 to about 11 mol %, of pendant groups of the fluorinated monomer are chemically grafted to the olefinic polymer. As shown below in Example 2, the percentage of grafted pendant groups increases when higher concentrations of free-radical catalyst and/or higher grafting temperatures are used. The olefinic polymer is invariably crosslin ked during the grafting reaction. Crosslinking is beneficial, enhancing strength properties and use temperature of the olefinic polymer.

The grafted fluorinated monomer pendant groups initially contain a terminal moiety selected from —$SO_2F$, —COF, —$CO_2R'$ or —CN. The sulfonyl fluoride or carbonyl fluoride moieties may subsequently be converted by known chemical methods to the moieties —$SO_2Y$ or —$CO_2Y'$ wherein Y is OM or OH and Y' is M or R', M and R' being defined as above. For example, the fluorides may be hydrolyzed by treatment with an alkali metal (or ammonium) hydroxide/methanol/water mixture at a temperature in the range of about 40° to about 80° C. to provide the salt wherein Y and Y' are OM and M, respectively. The free acids may then be obtained by treating the salts with, for example, a 1:1 mixture of water and methanol. Alternatively, —$CO_2R'$ moieties may be hydrolyzed to —$CO_2M$ or —$CO_2H$ moieites.

Compositions according to the present invention are useful as catalysts for industrial processes. For example, the free-acid form of the sulfonate terminated pendant groups have been found to be unusually effective catalysts for chemical reactions activated by an acidic catalyst or catalyst component. Examples are Friedel-Crafts alkylation and isomerization reactions, such as the alkylation of toluene with hexene, and acid-catalyzed polymerization, such as the polymerization of tetrahydrofiran. The present graft copolymers, wherein the terminal moieties of the grafted fluoromonomer groups are —$SO_3H$, are more effective as catalysts than conventional Nafion® perfluorosulfonic acid resins, especially when the graft copolymers are employed in the form of a powders or porous sheet having a high surface area in the range of about 0.5 $m^2/g$ to about 60 $m^2/g$, preferably about 4 to about 40 $m^2/g$. Preferred high surface area graft copolymer powders are prepared from (powdered oxide)-supported olefinic polymers which are in turn prepared as described in U.S. Pat. Nos. 4,187,210 and 5,292,584, both incorporated herein by reference.

The graft copolymers of the invention in the form of powders or porous sheet, although crosslinked, can be processed into useful transparent gas-barrier films and membranes of high tear strength (>1100 g/mm) by hot pressing at temperatures above about 120° C. under uniform pressures of at least 1,000 psi, preferably at least 2000 psi, as illustrated in Example 1 below. With terminal moieties in the free acid form, the hot pressed films are superior to Nafion® Perfluorinated membranes as barriers against methanol. The films have utility as membranes for batteries and other electrochemical cells, preferably in cells, however, where extended exposure to harsh bases or alkali is not necessary. Film thickness is normally in the range of 0.1 to about 20 mils, preferably about 1 to 5 mils.

The crosslinked, graft copolymers of the invention, in porous sheet form, are also useful in gas diffusion electrodes for fuel cells. For utility in a gas-diffusion electrode assembly for a fuel cell, a porous sheet according to the present invention can provide ionic (proton) conductivity, in combination with an additional component of the assembly which provides electronic conductivity.

The graft copolymers in the free-sulfonic-acid form are particularly useful as catalysts when the base olefinic polymer is supported on a magnetic oxide such as magnetite because the catalyst can be readily removed from a reaction medium by application of a magnetic field. Magnetic catalyst recovery is especially useful in liquid systems such as the polymerization of tetrahydrofuran.

The invention will be more readily understood by reference to the following non-limiting examples which illustrate its basic principles. In the examples, percentages are by weight unless otherwise indicated.

EXAMPLE 1

Grafting of Polyfluoroalkyethersulfonyl Fuoride onto PE

Sheets of Tyvek® polyethylene, having a surface area of at least 20 m²/g were dipped into a solution of benzoyl peroxide in methylene chloride, shaken to remove excess solution and air-dried. This experiment was repeated with each sample of polyethylene sheet being dipped into a corresponding solution of benzoyl perioxide at various concentrations, as indicated below. The coated porous sheets were immersed in liquid fluorinated monomer of the formula (2):

$$CF_2=CF_2OCF_2CF(CF_3)O[CF_2]_2SO_2F \quad (2)$$

and heated under nitrogen for 8 h at 92–95° C. After cooling, the sulfonyl fluoride groups were converted first to sodium sulfonate groups by soaking for 24 h in a solution containing 18 weight % sodium hydroxide, 42 weight % methanol and 40 weight % water; the solution was initially heated to 60° C., then allowed to cool. The terminal sulfonate groups were then converted to sulfonic acid groups by soaking the grafted polymer sheets in a 1:1 mixture of water and methanol for 2 h. The sheets were thoroughly washed with deionized water, dried and analysed. Results are in Table 1.

TABLE 1

| Wt. % | Experiments 1–4 | | | |
|---|---|---|---|---|
|  | 1 | 2 | 3 | 4 |
| BP* in soln | 10.0 | 5.0 | 2.0 | 1.0 |
| BP* on sheet | 20.0 | 11.0 | 2.0 | 1.0 |
| M2** grafted to sheet | 20.4 | 18.0 | 16.0 | 18.0 |
| % F in grafted sheet** | 5.5 | 6.9 | 4.9 | 7.6 |

*BP = Benzoyl peroxide
**M2 = monomer (2) after conversion to the sulfonic acid

Sample 2 picked up 4 weight % water when stored in liquid water at 80° C. The porous sheets were converted to gas tight transparent films by hot pressing at 160° C. between aluminum or Kapton® Polyimide film under uniform pressure of 2 kpsi (13.8 MPa). Uniform pressure was achieved by inserting at least one 0.25 in thick polytetrafluoroethylene (PTFE) sheet between the aluminum or Kapton® film and the press platen. When PTFE sheets were not used to provide uniform pressure, part of the polyethylene films remained porous. Pressure was retained until the films had cooled to room temperature to avoid excessive shrinkage. The polyethylene was found to have been crosslinked under the grafting conditions.

The fluorosulfonate grafted polyethylene films were much less permeable to methanol than were commercial Nafion® pefluorinated membranes, and, therefore, are particularly useful as membranes for fuel cells.

EXAMPLE 2

Additional experiments employing the same reactants and catalyst as in Example 1 have shown that the extent of grafting of monomer (2) to polyethylene sheets increases with increasing catalyst concentration and with increasing temperature. In every case, the polyethylene was crosslinked. Results given in Table 2 show the weight % of monomer (2) grafted to the Tyvek® sheet before and after conversion of sulfonyl fluoride groups to sulfonic acid groups. Benzoyl peroxide (BP) was coated onto Tyvek® sheet from methylene chloride solution; BP concentration was 2% in the first 12 experiments, 5% in the next 12 experiments, and 10% in the remaining experiments.

TABLE 2

| Tyvek ® Sample | % BP on Sheet Before Heating | Graft Temp ° C. | % (2)(SO₂F) in Product | % (2)(SO₃H) in Product |
|---|---|---|---|---|
| 1-A | 8.3 | 95 | 23.1 | 8.6 |
| 2-B | 5.2 | 95 | 24.0 | 9.2 |
| 3-C | 6.5 | 95 | 19.3 | 8.2 |
| 4-D | 4.5 | 95 | 18.4 | 14.6 |
| 5-A | 6.5 | 110 | 34.8 | 7.6 |
| 6-B | 4.2 | 110 | 30.3 | 8.1 |
| 7-C | 5.6 | 110 | 29.8 | 7.2 |
| 8-D | 3.7 | 110 | 29.1 | 11.4 |
| 9-A | 15.8 | 95 | 29.1 | 17.0 |
| 10-B | 16.6 | 95 | 36.3 | 20.3 |
| 11-C | 13.5 | 95 | 31.0 | 23.0 |
| 12-D | 9.2 | 95 | 32.0 | 25.2 |
| 13-A | 22.1 | 110 | 43.1 | 22.1 |
| 14-B | 15.2 | 110 | 44.9 | 25.3 |
| 15-C | 17.0 | 110 | 43.6 | 24.6 |
| 16-D | 12.5 | 110 | 42.5 | 29.6 |
| 17-A | 23.7 | 120 | 49.8 | 25.6 |
| 18-B | 15.7 | 120 | 47.6 | 23.9 |
| 19-C | 18.0 | 120 | 48.8 | 30.5 |
| 20-D | 13.7 | 120 | 48.1 | 33.9 |
| 21-A | 24.9 | 95 | 51.8 | 27.5 |
| 22-B | 18.3 | 95 | 51.9 | 40.6 |
| 23-C | 26.2 | 95 | 60.1 | 54.1 |
| 24-D | 17.6 | 95 | 56.3 | 50.4 |
| 25-A | 26.4 | 110 | 55.9 | 31.1 |
| 26-B | 23.1 | 110 | 51.2 | 35.9 |
| 27-C | 22.1 | 110 | 55.6 | 40.8 |
| 28-D | 18.4 | 110 | 54.2 | 42.7 |
| 29-A | 26.5 | 120 | 54.6 | 35.8 |
| 30-B | 19.8 | 120 | 53.3 | 38.5 |
| 31-C | 24.0 | 120 | 52.9 | 40.0 |
| 32-D | 18.4 | 120 | 54.1 | 44.3 |

Tyvek® polyethyene samples employed were as follows:

| Letter | Thickness (mil) | Density (oz/yd²) |
|---|---|---|
| A | 5.3 | 1.25 |
| B | 6.4 | 1.60 |
| C | 7.5 | 2.0 |
| D | 10.2 | 3.20 |

When a grafting temperature of 130° C. was used, the Tyvek® sheet shrank and warped. However, grafting was successfully achieved.

Percentages were given by $$W \times 100/(W+W_s)$$

where W=weight gained by sample; and $W_s$=Initial sample weight

The results in Table 2 show increased grafting was obtained at higher peroxide concentrations and at higher grafting temperatures. The polyethylene substrates were crosslinked in every instance.

EXAMPLE 3

Grafting of Compound I onto UHMWPE Powder

Powdered ultrahigh molecular weight polyethylene (UHMWPE) having a high surface area of about 5 m²/g was coated with 21% benzoyl peroxide solution in methylene chloride, as described in Example 1. The coated powder was heated at 92–95° C. for 8 h in liquid monomer (2). Sulfonate groups in the grafted product were converted to sulfonic acid groups as in Example 1. The final product was found to contain 35.5 weight % of monomer (2) as the sulfonic acid (19.7% F).

The above grafing reaction was repeated on a larger scale, yielding a product containing 27.6 weight % of monomer (2) as the sulfonic acid grafted thereto. This product was found to have higher activity than Nafion® NR 50 for catalyzing the alkylation of toluene with heptane. The product was also effective as a catalyst in the liquid phase polymerization of tetrahydrofturan.

EXAMPLE 4

Grafting of Monomer (2) onto Magnetite-Suported UHMWPE

A. Polyethylene supported on ferric oxide (magnetite) was prepared by catalytic polymerization of ethylene in the presence of magnetite as follows. A pressure vessel was charged under nitrogen purge with 50 g of magnetite ($Fe_3O_4$) which had been previously dried under nitrogen at 150° C. for 18 h, said magnetite dispersed in 400 ml of dry, oxygen-free cyclohexane containing 6 mmoles of triisobutyl-aluminum and 0.2 moles of tetraneophylzirconium. The vessel was then pressured with ethylene at 100 psi (690 kPa) and polymerization was carried out at 54° C. for 8 h, during which time 61 g of ethylene were absorbed. The final, dry magnetite-supported polyethylene blue-gray powdered product weighed 75 g and contained approximately 33 weight % polyethylene.

B. The magnetite-supported powdered polyethylene from Part A was grafted with monomer (2) as follows. The powdered product from Part A was coated with 5% benzoyl peroxide in ethylene chloride. The liquid was decanted off and the coated product was kept wet with solvent to prevent possible decomposition of the peroxide by the iron oxide. The solvent-moist product was added to a shielded 3-neck flask fitted wit nitrogen purge, paddle stirrer, and downward set condenser, said flask containing 400 ml of monomer (2) at 70–90° C. The solvent flashed off instantly. Grafting was carried out at 95–98° C. for 6 h, followed by 1 h at 120° C. After filtering, the grafted product was placed in water and blended to break up lumps. The sulfonyl fluoride groups were hydrolyzed to sodium sulfonate groups with an (18% sodium hydroxide)/(40% water)/(42% methanol)-mixture as described in Example 3. Sulfuinc acid rather than hydrochloric acid was used to convert -the sulfonate groups to sulfonic acid groups because of the reactivity of magnetite towards hydrochloric acid The sulfonate was slurried in 600 ml of water to which was added 400 g of concentrated sulfuric acid. The temperature rose to 65° C. After 5 min, the product was removed by lowering a strong magnet contained in a polyethylene bag into the slurry and the recovered product was immediately reslurried in 3 l of water. The washed product was again recovered magnetically. Washing was twice repeated. The final dry, grafted, sulfonic-acid-containing product weighed 90 g. This product was an effective catalyst for the liquid phase polymerization of tetrahydrofuran; the catalyst was readily separated and recovered from the polymerization mixture by application of a magnetic field.

For analytical purposes, the ferric oxide was removed from a sample of the product by dissolution in concentrated hydrochloric acid. The white product was washed with water until the washings were neutral, then dried at 90° C. Analysis: F, 24.13%, corresponding to an equivalent weight of 1020. By acid titration, the equivalent weight was 1163.

I claim:

1. Process for preparing a graft copolymer comprising coating an olefinic polymer with a catalytically effective amount of free-radical catalyst, and contacting and reacting the catalyst-coated olefinic polymer with at least one fluorinated monomer at a temperature of about 25° to about 140° C.; said olefin ic polymer comprising repeat units of ethylene and, optionally, one or more 1-olefin comonomers having the formula $CH_2$=CHR, carbon monoxide, vinyl acetate, allyl (meth)acrylate, and alkylvinyl ether, wherein said R is selected from the group consisting of n-alkyl containing 2–8 carbon atoms, and the aforesaid alkyl groups contain 1–8 carbon atoms; and said fluorinated monomer having the formula

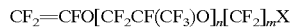

wherein:
X is —$SO_2Y$, —CN, —COF or —$CO_2Y'$, n is 0 or 1–6, m is 1–3;
Y is F, OH or M and Y' is H, R' or M;
R' is $C_{1-8}$ alkyl; and
M is alkali metal, ammonium or quaternary ammonium; such that said graft copolymer contains about 0.1 to about 17 mol % of grafted pendant groups of fluorinated monomer.

2. Process according to claim 1 wherein the olefinic polymer is polyethylene.

3. Process according to claim 2 wherein the olefinic polymer is ultrahigh molecular weight polyethylene having a molecular weight of at least 800,000.

4. Process according to claim 1 wherein, in the formula for the fluorinated monomer, X is —$SO_2Y$, n is 1 and m is 2.

5. Process according to claim 1 wherein the catalyst is an organic peroxide.

6. Process according to claim 5 wherein the catalyst is dissolved in a halogenated organic liquid.

7. Process according to claim 1 wherein the olefinic polymer is in the form of powder, film, fiber or porous sheet.

8. The process according to claim 7 wherein the olefinic polymer is a powder having a surface area of at least about 0.5 $m^2/g$.

9. The process according to claim 7 wherein the olefinic polymer is a powder and supported on an inorganic oxide.

10. The process according to claim 9 wherein the inorganic oxide is magnetic.

11. The process according to claim 10 wherein the magnetic oxide is magnetite.

12. The process according to claim 9 wherein the graft copolymer product is separated from the grafting reaction mixture by means of a magnetic field.

13. A process of catalyzing a Friedel-Crafts reaction by employing an effective amount of a catalyst comprising a powdered graft copolymer prepared by the process of claim 1.

14. The process of claim 13 wherein the powdered graft copolymer catalyst is admixed with at least one Lewis acid.

15. The process of claim 13, further comprising applying a magnetic field to isolate and recover the powdered graft copolymer catalyst.

16. A process of catalyzing polymerization by employing an effective amount of a catalyst comprising a powdered graft copolymer prepared by the process of claim 1.

17. The process of claim 16 wherein the polymerization comprises the polymerization of tetrahydrofuran.

18. The process of claim 17, further comprising applying a magnetic field to isolate and recover the powdered graft copolymer catalyst.

* * * * *